March 18, 1952 C. W. MOTT 2,590,065
MOWER STRUCTURE
Original Filed Aug. 16, 1947 2 SHEETS—SHEET 2
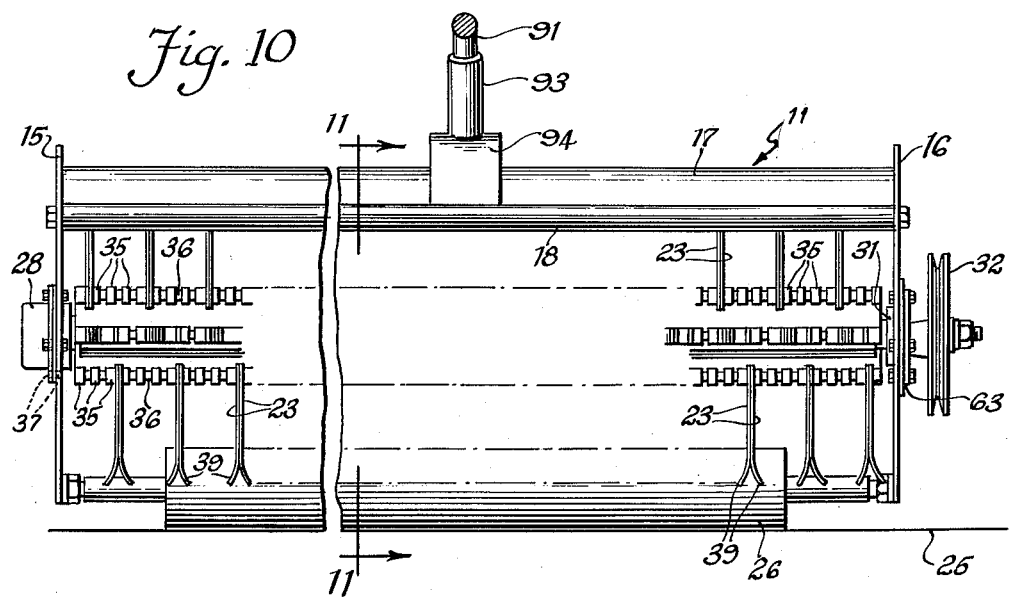
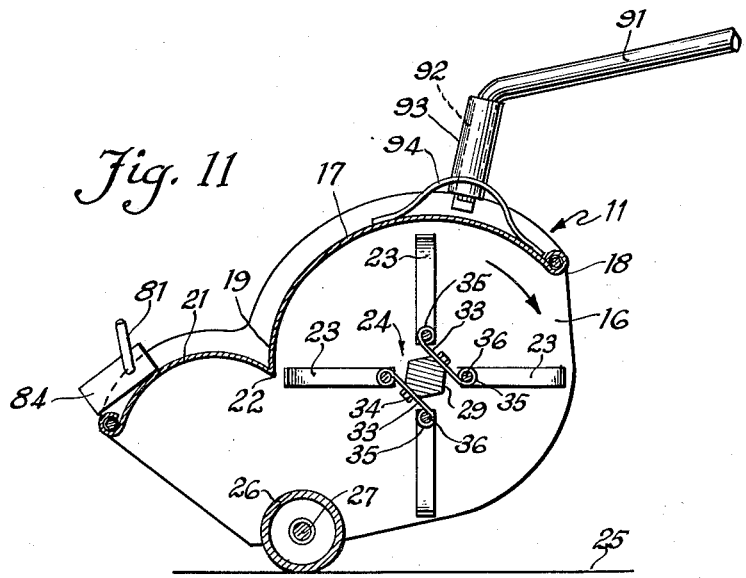
Inventor.
Carl W. Mott
By Paul O. Pippel
Atty.

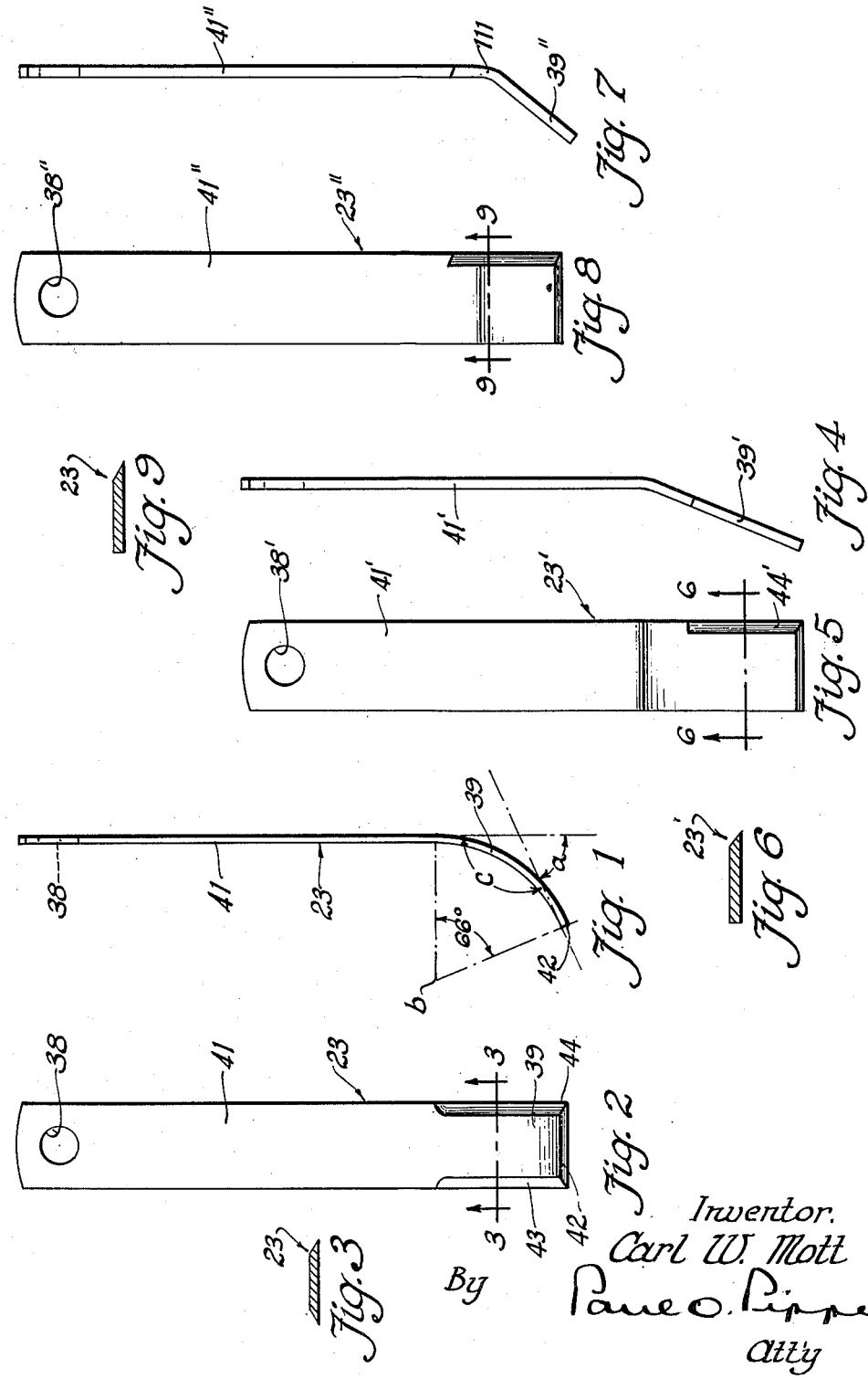

Patented Mar. 18, 1952

2,590,065

UNITED STATES PATENT OFFICE 2,590,065

MOWER STRUCTURE

Carl W. Mott, Lake Ozark, Mo., assignor to International Harvester Company, a corporation of New Jersey Original application August 16, 1947, Serial No. 768,993. Divided and this application July 29, 1948, Serial No. 41,344

13 Claims. (Cl. 56—289)

This invention concerns grass-cutting mowers of a type employing flails pivotally mounted on a carrier which is rotatable at high speed about a horizontal axis for sweeping cutting edges of the flails into the grass for cutting the same, and relates more particularly to an improved type of flail and mounting thereof.

This application is a division of my co-pending patent application, Serial No. 768,993, filed August 16, 1947, for Hammer Knife Mower. Said application discloses, in detail, a hammer knife mower which utilizes the type of flail herein disclosed. It will suffice for the present disclosure, therefore, to explain that such a mower, in addition to being serviceable for cutting grass of normally-cropped height upon a lawn, golf course, or the like, is also capable of cutting abnormally tall grass. Such a mower employs grass-cutting flails pivotally mounted upon a rotatable carrier for swinging radially outwardly from such carrier when it is rotated at high speed, thus enabling sharpened end portions of the flails to chop the grass into short pieces irrespective of the position of the grass stems at the time of being intercepted by flails. This principle of operation enables the mower to operate analogously to a hammer mill, the bottom of the mower unit being open, whereby the flails can cooperate with the ground surface in much the same manner that flails of the hammer mill cooperate with an opposed wall which holds the material that is to be comminuted within reach of revolved flails.

Additional information regarding the mower unit in which the invention herein described and claimed is useful can be had by reference to the aforesaid co-pending patent application.

The general object of this invention is the provision of an improved type of cutter flail or knife provided with a cutter end portion turned outwardly from a pivotally supported shank portion in a manner enabling the cutter portion to cut a miniature swath while accommodating centrifugal discharge of cut grass stems endwise from the flail.

A still further object is the provision in a hammer knife type of mower of an arrangement wherein flail knives according to the next proceeding object are arranged in pairs with the shanks of each pair in back-to-back relation and the outwardly turned cutter end portions of each pair in diverging relation. This arrangement causes the shank of each knife to react against the shank of the knife paired therewith, so that normally the paired knife shanks complementally reinforce one another but are slightly separable under the force of hard non-cuttable foreign objects which may accidentally lodge between paired shanks, and this capability of the paired knife shanks minimizes the likelihood of their being broken by such foreign objects as sticks, shrubbery stems or other relatively large foreign objects projecting upwardly from the ground surface.

Other desirable objects inherent in and encompassed by the invention will be comprehendable from the ensuing description, the appended claims, and the annexed drawings wherein:

Fig. 1 is an elevational view looking edgewise of a flail or knife embodying a preferred form of the invention.

Fig. 2 is an elevational view looking flatwise of the knife shown in Fig. 1.

Fig. 3 is a transverse sectional view taken on the line 3—3 of Fig. 2.

Fig. 4 is a side elevational view taken edgewise of a modified form of flail or knife.

Fig. 5 is an elevational view taken flatwise of the knife shown in Fig. 4.

Fig. 6 is a sectional view taken on the line 6—6 of Fig. 5.

Fig. 7 is a side elevational view taken edgewise of a third form of flail or knife.

Fig. 8 is an elevational view taken flatwise of the knife shown in Fig. 7.

Fig. 9 is a sectional view taken on the line 9—9 of Fig. 8.

Fig. 10 is a front elevational view of the mower unit with only part of the hammer knives and of the rotor carrying the same shown in detail, this view being drawn to a reduced scale with respect to that used in the lower numbered figures.

Fig. 11 is a sectional view taken through the mower unit at the plane indicated by line 11—11 in Fig. 10 and also being at a reduced scale similarly to Fig. 10.

The flail shown in Figs. 1, 2 and 3 comprises a rigid strap-like body of metal having a straight shank portion 41 and a cutter end portion 39 adjacently to a free end 42 of such body. In Fig. 1 it is illustrated that said end portion 39 of this species of flail extends endwise from the straight shank portion 41 while turning outwardly from one of the broad flat faces of the shank portion to space the free end 42 outwardly from such face. Such outward turning of the end portion 39 is at an acute angle of departure $a$ from the flat faces of the shank 41, this angle of departure being sufficiently restricted to accommodate contrifugal discharge of cut glass axially of the flail along the outwardly turned section 39 and over the free end 42. An angle $a$ not substantially exceeding 65° is preferred for enabling the flail end portion to cut a reasonably wide swath while avoiding accumulation of grass stems upon such end portion. The end portion 39 illustrated in Fig. 1 has an angle of departure $a$ of 66° which has been found in practice to give excellent results.

It will also be observed in Figs. 1, 2 and 3 that the outwardly turned end portion 39 has sharpened opposite edges and that the bevels 43 and 44 forming such edges slope from a common broad face of the strap-like body of the flail to the opposite face thereof. The cutter end portion 39 conforms to an arc generated about an axis $b$, Fig. 1, and subtends an arc of 66°. The angle $c$ included between the shank 41 and the end portion 39 is 105°. By sharpening both edges of the outwardly turned flail end portions, the flails are made reversable, making it possible to change to a fresh cutting edge for striking the grass after the other of the edges has become dull or mutilated.

Figs. 4, 5 and 6 illustrate a modified form of cutter flail or knife substitutable for that shown in Figs. 1, 2 and 3. This modified form of knife differs from that of Figs. 1, 2 and 3 in the respect of having a straight outwardly turned portion 39' instead of this portion being curved as the corresponding portion 39 of the first embodiment. A cutting edge 44' is formed upon only one edge of this second knife embodiment, although it is contemplated that the outwardly turner cutter end portion may have its opposite edge sharpened as illustrated in Fig. 2. The small angle of departure for the end portion 39' with reference to the plane of the shank 41' makes a sacrifice in width of swath cuttable thereby, but results in a form of flail less subject to bending when accidentally striking a hummock of frozen ground or the like if used for shredding small grain stubble or stalks in the field during late autumn or winter months.

A third embodiment of flail knife, shown in Figs. 7, 8 and 9, distinguishes from the second embodiment in the respect of having a curved section 111 between the straight flat shank 41'' and the outwardly turned portion 39''. The straight outwardly turned portion 39'' of this embodiment has an angle of departure in the nature of 40° with reference to the plane of the shank 41''. This angle of departure is about the median of a departure angle range which adapts a straight end portion to cut a fairly wide swath and still assure satisfactory shedding of grass stems centrifugally from the flail when such stems are moist from rain or early-morning dew.

A mower unit 11 illustrating cooperative back-to-back use of flail knives of the type described above is shown in Figs. 10 and 11. This unit includes a rotor casing including end walls 15 and 16 and a semi-cylindrical cover shroud 17 extending therebetween lengthwise of the unit. Cover shroud 17 has a front edge 18 and a rear edge 19, thereby providing an open front side of the rotor chamber beneath the edge 18, an open bottom side for such chamber and an open lower portion of a rear side of the chamber beneath the rear edge 19. A deflector wall 21, which is arched transversely, extends lengthwise between the ends walls of the unit and has a front edge 22 disposed adjacently to the rear edge 19 of the cover shroud and also adjacently to a circular path traversed by the outer ends of hammer knives or flails 23 during rotation of a carrier structure 24 upon which such flails are pivotally mounted. This carrier structure 24 rotates in the direction indicated by the arrow in Fig. 11, whereby the flails are caused to cut grass or the like of which the stems project upwardly from a ground line 25 and sweep the cut grass stems rearwardly through a discharge space beneath the rear edge 19 of the shroud and beneath the arched deflector wall 21. Disposal of the front edge of the deflector wall 21 adjacently to the circular path traversed by the outer ends of the flails enables this deflector plate to intercept the precipitated grass stems and prevent them from being carried upwardly and forwardly beneath the shroud 17, which action would cause accumulation of such stems in front of the unit so that its operation would be impeded.

When the unit is in operation, it is partly carried by a long cylindrical ground-engaging roller 26 journaled upon a bearing rod 27 extending between the casing end walls 15 and 16 and secured thereto.

End wall 15 has a bearing unit 28 mounted thereon for rotatively supporting one end of a rotatable core or shaft 29 of the carrier or rotor 24. Said shaft 29 is hexagonal in cross-section as illustrated in Fig. 11. The opposite end of the shaft 29 passes through a hole (not shown) in the end wall 16 and also through a bearing 31 which is carried by a plate 63 mounted upon such wall. This bearing rotatably supports the end of the shaft passing therethrough, and that portion of the shaft projecting exteriorly of the end wall 16 carries a belt pulley 32 which is constrained for rotation therewith. Pulley 32 constitutes part of a driving train for the rotatable flail carrier 24.

The carrier shaft 29 together with elongated plates 33 secured to opposite facets thereof by bolts 34 make up a center structure of the carrier. Each plate 33 has a row of tongues 35 projecting outwardly from each of its opposite longitudinal edges, the tongues in each row being spaced apart axially and being bent into circular formations about axes extending endwise of the carrier. Each row of the circularly bent tongues 35 slidably receives a pivot rod 36 for pivotal attachment of an associated row of flails 23. A hole 37 extending through a flange of the bearing 28 and through the mower unit end wall 15 is placed for axial alinement with the rows of circularly curved tongues 35 to facilitate endwise withdrawal and reinsertion of the rods pursuant to assembly or replacement of the flails 23. In Fig. 2 where one of the flails is shown in elevation, it can be seen that the flails have a hole 38 for receiving their associated pivot rod 36. Assembly of the flails onto their associated pivot rod is accomplished by insertion of the flat flail shank between certain of the axially spaced circularly curved tongues 35 to place the holes 38 in alinement with the axis of the circularly bent tongues preparatory to endwise sliding of the rod for causing it to pass through the holes 38. In Fig. 10 the flails 23 are shown mounted in pairs, each pair having straight shank portions arranged in back-to-back relation and with outwardly curved portions 39 in diverging relation. Each pair of flails 23 constitutes a blade structure of which the portions 39 constitute cutting blade furcations. It will be noted that these flail portions or furcations 39 diverge radially outwardly with respect to the carrier axis and that such furcations also diverge oppositely at angles of departure from a median extending perpendicularly from the carrier-extending axis through the crotch of these furcations during carrier rotation while the flail structures project radially of the carrier 24 as illustrated in Fig. 11. The diverging portions 39 of the flails cut narrow swathes of grass stems during rotation of the carrier and since the pairs of flails on each rod 36 are spaced apart axially thereof, the pairs of flails on adjacent rods are disposed out of alinement circumferentially of the carrier so the space between the circular paths traversed by the outwardly turned flail end portions on each rod will be traversed by the outer end portions of the flails on adjacent rods during each revolution of the carrier.

Means for supporting the unit in selective tilted positions about the axis of ground roller shaft 27 includes a prop rod 91 having an angularly formed end portion 92 disposed in a socket 93 mounted on the cover shroud 17 by a bracket 94.

Having described a limited number of knife flails together with an arrangement showing how they cooperate in back-to-back relation in a mower unit, with the view of clearly and concisely illustrating the invention, I claim:

1. In a hammer knife mower, a rotatable carrier comprising a pivot rod extending axially thereof in radial spaced relation to the rotational axis of such carrier, a plurality of pairs of cutter flails pivotally mounted upon and spaced lengthwise of said rod, each of said flails comprising a rigid strap-like body having a shank portion lying in a plane normal to the rod axis and pivotally connected at an end to the rod for pivotal movement within the plane parallel to flat faces at opposite sides of said shank portion, said body also having a cutter end portion turned outwardly from a face of the associated shank portion within the limit of about 65°, and the knives of said pairs being arranged in back-to-back relation with said outwardly turned end portions in diverging relation.

2. A hammer knife mower of the character set forth in claim 1, wherein there are a plurality of said rods spaced circumferentially of the carrier, wherein there are spacing means on the rods between said pairs of knives, and said spacing means being effective for maintaining the flails of adjacent of the rods out of registration circumferentially of the carrier.

3. The combination set forth in claim 1, wherein the pivoted ends of the shanks contain holes for receiving said rod as an expedient for establishing the pivotal connection with the rod.

4. In a hammer knife mower, a rotary carrier comprising a center structure extending lengthwise and coaxially of the carrier, said structure having circumferentially spaced facets extending lengthwise thereof, elongated plates secured to respective of said facets and each having rows of tongues projecting outwardly from opposite longitudinal edges thereof, the tongues in each row being spaced apart axially of the carrier and being bent into circular formations about an axis extending lengthwise of the carrier, pivot rods inserted endwise through the respective rows of circular tongues, and cutter flails pivotally connected with said rods within the space between certain of the tongues.

5. In a hammer knife grass mower, a rotor casing comprising end walls and a cover shroud having opposite front and rear edges extending between said end walls, leaving an open front side, an open bottom side and an open lower portion of a rear side of said casing; a rotor mounted in said casing for rotation about an axis extending between said end walls, hammer knife flails pivotally mounted on said rotor for swinging radially outwardly thereof pursuant to its rotation, the normal direction of rotation of the carrier being such as to carry the flails in a path of revolution extending forwardly beneath said shroud downwardly past the open front side of the casing, backwardly across the open side of the casing and upwardly across the open rear portion of the casing; and a deflector wall projecting rearwardly of the rear edge of said shroud to define the upper side of a discharge space leading rearwardly from the open rear portion of the casing, said deflector wall being arched from front to back and having a forward edge disposed in close proximity to the path traversed by the flails to divert the cut grass rearwardly through the discharge space.

6. A grass and the like cutting structure of non-cutter bar type comprising a blade carrier rotatable at high speed about a horizontal axis spaced upwardly from the ground surface, and a plurality of blades mounted on said carrier in spaced relation axially thereof and projecting radially of the carrier axis during such high speed rotation, each blade having a tip inclined toward the axis of the rotating carrier, certain successive of said blades axially of the carrier being in pairs with the tips of the blades in such pairs diverging from each other outwardly radially of the carrier, said pairs of blades being arranged in an interrupted helical formation about the carrier axis, and said pairs of blades having a proximity axially of the carrier to cut swaths that lap the swaths cut by axially adjacent pairs of blades.

7. A grass and the like cutting structure of non-cutter bar type comprising a blade carrier rotatable at high speed about a horizontal axis spaced upwardly from the ground surface, and a plurality of blades mounted on said carrier in spaced relation axially thereof and projecting radially of the carrier axis during such high speed rotation, each blade having a cutting edge portion inclined toward the axis of the rotating carrier, certain of the blades in successive contiguity axially of the carrier being in pairs with the inclined cutting edge portions thereof diverging oppositely at angles of departure from a median extending therebetween radially of the carrier, said angles of departure being confined to within approximately 65°, said pairs of blades being arranged in an interrupted helical formation about the carrier axis, and said pairs of blades having a proximity axially of the carrier to cut swaths that lap the swaths cut by axially adjacent pairs of blades.

8. A mowing machine of non-cutter bar type comprising a blade carrier for rotation at high speed about a horizontal axis spaced upwardly from the ground surface, and a plurality of blade structures mounted on said carrier in spaced relation axially thereof and projecting radially from the carrier axis during such high speed rotation, each blade structure including cutting blade furcations at its radially outer end, said furcations diverging from the carrier axis and diverging oppositely at angles of departure from a median extending perpendicularly from the carrier axis through the crotch of the furcations, said angles of departure being confined to within approximately 65°, said blade structures being arranged in an interrupted helical formation about the carrier axis and having relative proximity axially of the carrier to cut swaths that lap the swaths cut by axially adjacent structures.

9. In a hammer knife mower, a rotatable carrier, flail mounting means on said carrier in radial spaced relation to the rotational axis thereof, a plurality of pairs of cutter flails pivotally mounted upon said mounting means and spaced lengthwise of said carrier, each of said flails comprising a rigid strap-like body having a shank portion lying in a plane normal to the carrier axis and pivotally connected at one end to the mounting means for pivotal movement within a plane parallel to flat faces at opposite sides of said shank portion, said body also having a cutter end portion turned outwardly from a face of the associated shank portion within the limit of about 65°, and the knives of said pairs being arranged in back-to-back relation with said outwardly turned end portions in diverging relation.

10. In a hammer knife mower, a rotatable carrier, flail mounting means on said carrier in radial and circumferential spaced relation to the rotational axis thereof, a plurality of pairs of cutter flails pivotally mounted upon said mounting means and spaced lengthwise of said carrier, each of said flails comprising a rigid strap-like body having a shank portion lying in a plane normal to the carrier axis and pivotally connected at one end to the mounting means for pivotal movement within a plane parallel to flat faces at opposite sides of said shank portion, said body also having a cutter end portion turned outwardly from a face of the associated shank portion within the limit of about 65°, and the knives of said pairs being arranged in back-to-back relation with said outwardly turned end portions in diverging relation.

11. A cutter flail for a rotary grass mower comprising a rigid strap-like body having a substantially straight shank portion and a cutter end portion extending from one end thereof, said cutter end portion extending out of the plane of said shank portion at a maximum angle of departure in the nature of 65°.

12. A cutter flail for a rotary grass mower comprising a rigid strap-like body having a substantially straight shank portion and a cutter end portion extending from one end thereof, said cutter end portion terminating in a free end of said strap-like body and being curved out of the plane of the shank portion, the degree in curvature of said end portion being limited so a tangent thereto at the free end forms an angle of departure with the plane of said shank portion within the limit of 65°, and the tangent to said curved end portion at intermediate points thereon form angles of departure with said plane progressively diminishing in value as a function of the distance of such points from the free end.

13. A cutter flail for a rotary grass mower comprising a rigid strap-like body having a substantially straight shank portion and a cutter end portion extending from one end thereof, said cutter end portion being straight and extending out of the plane of said shank portion at an angle of departure in the nature of 40°.

CARL W. MOTT.

REFERENCES CITED

The following references are of record in the file of this patent:

UNITED STATES PATENTS

| Number | Name | Date |
|---|---|---|
| Re. 14,886 | Campbell | June 22, 1920 |
| 578,250 | Holland-Letz | Mar. 2, 1897 |
| 1,301,442 | Ike | Apr. 22, 1919 |
| 1,698,724 | Johnston et al. | Jan. 15, 1929 |
| 1,870,932 | Sterneman | Aug. 9, 1932 |
| 2,034,505 | Cline | Mar. 17, 1936 |
| 2,110,147 | Mable | Mar. 8, 1938 |
| 2,220,342 | Maga | Nov. 5, 1940 |
| 2,378,488 | Loewe et al. | June 19, 1945 |
| 2,505,089 | Bailey et al. | Apr. 25, 1950 |
| 2,509,343 | Henderson | May 30, 1950 |

FOREIGN PATENTS

| Number | Country | Date |
|---|---|---|
| 356,602 | Great Britain | Sept. 10, 1931 |